United States Patent [19]

Berg

[11] Patent Number: 5,194,087
[45] Date of Patent: Mar. 16, 1993

[54] FIREPROOF, WATERPROOF AND ACIDPROOF BINDER

[75] Inventor: Johannes G. Berg, Hovik, Norway

[73] Assignee: Norsk Proco A/S, Hovik, Norway

[21] Appl. No.: 701,734

[22] Filed: May 17, 1991

[30] Foreign Application Priority Data

| | | | |
|---|---|---|---|
| May 18, 1990 | [NO] | Norway | 902203 |
| Aug. 13, 1990 | [NO] | Norway | 903549 |
| Nov. 28, 1990 | [NO] | Norway | 904639 |

[51] Int. Cl.$^5$ ............................................. C09D 5/16
[52] U.S. Cl. ............................... 106/18.12; 501/108; 501/134
[58] Field of Search ........... 106/606, 612, 18.12, 106/635; 501/108, 122

[56] References Cited

U.S. PATENT DOCUMENTS

| | | | |
|---|---|---|---|
| 52,906 | 2/1866 | Taylor | 106/635 X |
| 1,757,470 | 6/1930 | Peebles | 106/84 |
| 1,762,911 | 5/1930 | Clauser | 423/311 |
| 2,281,834 | 5/1942 | Dietz et al. | 106/635 X |
| 2,656,281 | 10/1953 | Wasserman | 106/635 X |
| 3,707,386 | 12/1972 | Kurz | 106/84 |
| 4,347,285 | 8/1982 | Batdorf | 106/629 X |
| 4,366,136 | 12/1982 | Kartschmaroff et al. | 423/331 |
| 4,762,753 | 8/1988 | Perfetti | 428/450 |
| 4,789,652 | 12/1988 | Ichikawa et al. | 501/127 |
| 4,820,345 | 4/1989 | Berg et al. | 106/627 X |

FOREIGN PATENT DOCUMENTS

| | | |
|---|---|---|
| 1091 | 3/1979 | European Pat. Off. . |
| 240940 | 10/1987 | European Pat. Off. . |
| 62-030671 | 2/1979 | Japan . |
| 58-145660 | 8/1983 | Japan . |

Primary Examiner—Karl Group
Assistant Examiner—Chris Gallo
Attorney, Agent, or Firm—Pennie & Edmonds

[57] ABSTRACT

A fireproof, waterproof, and acidproof binder is characterized by a hardened composition of 10–90% by weight of alkali silicate comprising sodium waterglass, potassium waterglass or a mixture of the same, 1–40% by weight of reactive metal oxide from the group comprising magnesium, titanium, and zinc, preferably magnesium oxide, 1–70% by weight of calcium/magnesium carbonate, preferably dolomite, and, if desired, magnesium silicate, feldspar, a chemically active silica, potassium-sodium-aluminum silicate, sodium carbonate, expanded clay, wood fibers, cement, limestone dust, sand, an organic binder, water or mixtures of the same.

30 Claims, No Drawings

FIREPROOF, WATERPROOF AND ACIDPROOF BINDER

TECHNICAL FIELD

The present invention relates to a fireproof, waterproof and acidproof binder based on a hardened composition of alkali silicate, a reactive metal oxide from the group including magnesium, titanium, and zinc, and a calcium/magnesium carbonate. If desired, one or more of magnesium silicate, feldspar, chemically active microsilica, potassium/sodium-aluminium silicate, sodium carbonate, expanded perlite, expanded clay, wood fibers, cement, limestone dust sand organic binders mixtures there of may also be included in the composition.

BACKGROUND ART

In patent literature, several compositions are disclosed which include various combinations of alkali silicates, other silicates, oxides, phosphates, and chlorides.

U.S. Pat. No. 1,762,911 relates to the manufacture of a material for sealing fireworks which comprises a mixture of approximately 50% waterglass, approximately 10% metal oxide, and approximately 40% aluminium silicate or kaolin. This patent contains no disclosure of qualities which are relevant to the present invention, but is basic for later applications of oxide-alkali silicate compounds.

U.S. Pat. No. 1,757,470 relates to the manufacture of a fireproof and heat insulating material which, in addition to the mentioned and known oxide-alkali silicate compounds, comprises waste products from the manufacture of various soda compounds which are essentially calcium compounds. Fire preventing and heat insulating qualities are probable, but are not documented in the specification.

U.S. Pat. No. 3,707,396 relates to the manufacture of an impregnating agent/binder consisting of 100 parts by weight of alkali silicate, 135 parts by weight of a finely divided material from the group comprising silicium, ferro-silicium, copper-silicium, calcium-silicium compounds and mixtures of the same with 1-25 parts by weight of a finely divided oxymetal compound with grain size below 100 microns and a smooth surface.

This patent, thus, essentially relates to combinations of silicium metal compounds and oxymetal compounds and the effect of such compounds on alkali silicate bonds due to the fact that the added silicon compounds are transformed into $SiO_2$ and form insoluble alkali metal/silicate compounds. According to the specification, optimal effects are achieved with defined and relatively fine grain sizes both with regard to the silicon compounds and metal oxides of interest. There is reason to suppose that the alkali silicate-metal oxide reactions are decisive with regard to the water resistance of the reaction product, whereas the silicon metal compounds are believed to improve the mechanical qualities and to influence remaining resistance qualities, even though this does not appear in the specification.

European patent application 0,001,091 relates to the manufacture of a prepolymer based on alkali silicate and metal oxides which are, via a preliminary reaction and step-wise drying/condensation, transformed into a material which is suitable for shaping and pressing.

European patent application 0,240,940 relates to a composition for the manufacture of a hydrophilous film forming coating on aluminium and which comprises an alkali silicate, an inorganic accelerator, and a water soluble organic mixture of high molecular weight. The inorganic accelerator consists of a mixture comprising aluminium phosphate, magnesium phosphate, trivalent phosphoric acid, magnesium oxide, zinc oxide, and carbonates, sulphates, sulphites or chlorides of polyvalent metals. The application essentially relates to combinations of alkali silicates, inorganic accelerators on the mentioned basis, and said organic mixtures.

U.S. Pat. No. 4,762,753 relates to a mixture which acts as a foundation for a surface coating and consists essentially of an aqueous solution with 4–16% by weight of solids, 24–38% by weight of alkali silicate, 18–28% of magnesium oxide, magnesium hydroxide or mixtures of the same, 7–19% of titanium oxide, and 22–53% of mica. The coating is suitable for forming an electrically insulating coating on metal products.

U.S. Pat. No. 4,789,652 relates to a fireproof material for lining melting furnaces which contains fireproof basic materials including overburned magnesite, called "magnesia clinker". Overburned magnesite is produced at temperatures of 1600°–1700° C. and is distinguished by its excellent resistance against high temperatures. The material has no reactive power, in contrast to magnesium oxide which is manufactured by calcination in the temperature region of 800°–900° C.

The reactive qualities of calcinated magnesium oxide are desirable both with regard to its strength and degree of water resistance. Overburned magnesite in the form of magnesia clinker does not contribute to any of these qualities, but it shows considerably better qualities in case of high temperature loads than does calcinated magnesium oxide.

SUMMARY OF THE INVENTION

The present invention relates to a fireproof waterproof and acidproof binder comprising a hardened mixture of about 10 to 90% by weight of an alkali silicate, about 1 to 40% by weight of a reactive metal oxide comprising magnesium, titanium or zinc, and about 1 to 70% by weight of a calcium and/or magnesium carbonate. If desired, one or more of olivine, felspar, a chemically active micro silicate, a potassium-sodium-aluminium silicate, sodium carbonate, expanded perlite, expanded clay, cement, limestone dust, wooden fibers, sand, and an organic binder or mixtures of the preceding components may be included depending upon the particular end use of the product.

The products of the present invention may be used to form a fireproof material, a glue for sheet and paper products, or waterproof and acidproof coatings, e.g. for concrete or Leca products. Such products are also useful for other applications where there are strict combined requirements with regard to fire resistance, water resistance, acid resistance and mechanical qualities.

DETAILED DESCRIPTION OF THE INVENTION

What is new and essential in the present invention is that the reaction products of the disclosed binder combinations will be strong, fireproof, waterproof, and acidproof after hardening of the final composition without the use of increased pressures or temperatures. Hardening may also occur at increased pressure and temperature if reduced hardening periods are desired. Strong reaction products are achieved with short periods of pressure, or when high percentages of absorbing materials and other fillers are included.

Upon hardening in air, if desired at an increased temperature, the alkali silicate in the form of a sodium and/or potassium waterglass yields a brittle reaction product with a hard surface. This reaction product is not waterproof but is highly resistant to fire.

Reactive magnesium oxide and/or a reactive oxide of titanium and/or zinc can be included with the alkali silicate to form a composition which improves the waterproof quality of the hardened product, but which will reduce its fireproof quality. This reaction product at high temperature loads tends to pulverize, with the degree of pulverization depending on (1) the percentage by weight of magnesium oxide relative to waterglass in the composition, (2) the temperature and (3) partly due to the duration of the temperature load. The remaining prescribed components of the completed mixture can be added to eliminate the tendency of the final reaction product to pulverize. When used in combination with amorphous micro silica and cement, this component also contributes to increased solidity or stability of the final reaction product.

A preferred calcium/magnesium carbonate is dolomite which develops carbon dioxide gas when subjected to intense heat, and this gas has a fire retarding effect. This quality, together with an increase of volume of waterglass for resistance to intense heat, is essential for increasing the fire retarding effect of mixtures containing the prescribed components. This component will cause a moderate increase in the viscosity of the final mixture.

Magnesium silicate in the form of olivine can be used to increase the formation of gas/bubbles in the final mixture, and this quality may be utilized in combination with other known foaming agents if a foam-like final reaction product is desired. This component is used in an amount of up to about 50% by weight of the overall product, and also contributes to increased strength and viscosity, and prolonged pot-life of the composition.

Feldspar can also be used as a component of the inventive composition to considerably enhance the mechanical qualities in case of high temperature loads. Sodium, calcium or potassium feldspars or mixtures thereof, are utilized in an amount of up to about 40% by weight of the product. With particle sizes in the range of below about 5 microns, feldspar and amorphous micro silica complement each other with regard to imparting an efficient grain structure of the final mixture. The feldspar component will increase the degree of ceramization of the hardened product at high temperature loads and, thus, improve its mechanical qualities. The feldspar component also influences viscosity and contributes to increased strength at normal temperatures as well.

Chemically active micro silica in the form of amorphous micro silica may be used in an amount of up to about 30% by weight of the overall product to enhance the strength and acidproof quality of the final reaction product, whether the product is hardened at room temperature or at increased temperatures. Viscosity, gel-time and pot-life of the mixture may also be varied based on the particle sizes of the amorphous micro silica, and the same is true of mechanical qualities, both at normal or elevated temperatures. Amorphous micro silica in the form of silica dust recovered from the waste gases in manufacture of ferro silicon metal having a mean grain size from 0.1 to 0.2 micron will satisfy the highest requirements for fineness.

A potassium-sodium-aluminum silicate such as nepheline can be used to supplement the thermal qualities of the composition, especially relative to the feldspar component. Due to its practical availability within wide variations of fineness of the material, and due to its thermal qualities, nepheline may also be efficiently utilized as an adjusting component with regard to the overall grain structure of the solids in the final mixture. This component may be used in an amount of up to about 40% by weight of the overall product.

Washing soda (i.e., sodium carbonate), in an amount of up to about 10% by weight of the overall product, may be used to effect the viscosity, gel-time and pot-life of the final mixture or to influence the stability of the reaction product in a positive manner.

A wide variety of filler material may be included in the composition of the invention. Up to 30% by weight of expanded clay and up to 10% by weight of expanded perlite can be included to enhance the acidproof quality and reduce the weight of the final reaction product. Perlite also acts as a most efficient moisture absorbent.

Cement forming an active binder component, such as Portland cement, can be added in an amount of up to about 10% by weight when more rapid hardening is desired, or to enhance the strength and other stability qualities of the final reaction product. This component utilizes excessive water of the mixture and will, thus, also reduce the need for evaporating excessive moisture in the final reaction product.

Limestone dust in the form of chalk can be added in an amount of up to about 20% by weight to obtain an approximately white reaction product, to which dye may be added to obtain light colors which may be desired when the composition is used to form a surface coating, e.g. on concrete-like products.

Sand, preferably in the form of fine quartz sand, can be included in an amount of up to about 30% by weight to provide a desired grain structure of the final mixture and also to increase the hardness of the final reaction product.

An organic binder component is especially suitable if the final mixture is to form a binder/glue in compositions which also contain other organic components, e.g. wood fibers, which can be used as a filler in an amount of up to about 40% by weight of the overall product. In this connection, the binder is used in an amount of up to about 40% by weight of the overall product to influence the waterproof and mechanical qualities of the composition. Suitable binders include ureas, melamines, phenols, vinyl acetate, mineral spirits, acrylics, bitumens, tall oil resins and glycols, with ethylene glycol being preferred. This component also prevents fissuring of the hardened mixture, in particular when it is used as a coating.

EXAMPLES

The following examples illustrate the features of the present invention to particular formulations. All compositions are added by weight unless otherwise specified.

EXAMPLE 1

| 1. | Waterglass | 50% |
| 2. | Magnesium oxide | 20% |

-continued

| | | |
|---|---|---|
| 3. | Dolomite | 30% |
| | | 100% |

The components are combined with continuous mixing to form a homogenous mixture. This mixture is then hardened at room temperature. After 48 hours, the hardened product is hard and rigid. After immersion in water for 10 days, and upon exposure to freezing/thawing cycles, no visible change of the product is observed. Upon immersion in hydrochloric (33%) and acetic acid (60%), no visible change is observed. The product may be subjected to temperature loads by a point flame of approximately 1100° C. for 30 minutes and tolerates such treatment without disintegrating.

The mixture may be used as a coating on surfaces of concrete, Leca, and brick to yield a hard surface which strongly adheres to the foundation. Any fissuring during hardening of such coating may be compensated by optimalization of the total grain structure of the mixture, or in the other manners which are discussed in connection with other Examples.

EXAMPLE 2

| | | |
|---|---|---|
| 1. | Waterglass | 44% |
| 2. | Magnesium oxide | 11% |
| 3. | Dolomite | 11% |
| 4. | Feldspar | 28% |
| 5. | Micro silica | 6% |
| | | 100% |

The components are combined by continuous mixing to form a homogenous mixture. This mixture is then hardened at room temperature. The hardened product has mechanical qualities which are slightly better than those of the product of Example 1. Water resistance is good, but some rubbing off of the product occurs in the preliminary phase, this stops after a few hours. The product shows good fire resistance and develops ceramic-like properties at temperature loads of more than approximately 900° C. It tolerates flame loads with a point burner at approximately 1400° C. for more than 1 hour.

EXAMPLE 3

| | | | |
|---|---|---|---|
| 1. | Waterglass | Premix | 45% |
| 2. | Soda | | 9% |
| 3. | Magnesium oxide | | 18% |
| 4. | Dolomite | | 28% |
| | | | 100% |

The components are mixed to a homogenous mixture, which is then hardened at room temperature. The sodium carbonate component (in the form of soda) prolongs pot-life of the formulation and reduces the viscosity of the mixture. Thus, hardenign occurs at a slightly slower rate than for the products of the other Examples. The qualities of the final hardened product are similar to those of Example 1.

A portion of Portland cement of approximately 10% of the mixture will reduce the pot-life of the mixture by more than 50%. Hardening is quicker, but slower than in case when Portland cement is added to a mixture that does not contain the soda component.

EXAMPLE 4

| | | |
|---|---|---|
| 1. | Waterglass | 33% |
| 2. | Magnesium oxide | 6% |
| 3. | Dolomite | 20% |
| 4. | Olivine | 35% |
| 5. | Waterglass | 6% |
| | | 100% |

The mixture has a pot-life of approximately 60 minutes, and is hardened at room temperature. The hardened porduct has mechanical qualities similar to those of Example 1. The product develops ceramic-like properties at temperature loads of more than 900° C. and tolerates flame loads of approximately 1400° C. for more than 1 hour.

EXAMPLE 5

| | | | |
|---|---|---|---|
| 1. | Waterglass | Premix | 34% |
| 2. | Magnesium oxide | | 6% |
| 3. | Dolomite | | 13% |
| 4. | Feldspar | | 7% |
| 5. | Fine wood chips | | 11% |
| 6. | Perlite, expanded | | 3% |
| 7. | Leca, crushed | | 9% |
| 8. | Nepheline, rough | | 4% |
| 9. | Micro silica | | 13% |
| | | | 100% |

The premix is admixed in two batches: about half is added to the fine wood chips and the balance is added to the Nepheline. These batches and the remaining components are then mixed together. The mixture is hardened by pressing for 4 minutes at 170° C. The product was tested and complies with requirements for fire resistance according to Class A2/DIN 4102.

EXAMPLE 6

| | | | |
|---|---|---|---|
| 1. | Waterglass | Premix | 30% |
| 2. | Magnesium oxide | | 6% |
| 3. | Vinyl acetate disp. | | 5% |
| 4. | Dolomite | | 17% |
| 5. | Phenol glue powder | | 4% |
| 6. | Waterglass | | 5% |
| 7. | Wood chips, rough | | 15% |
| 8. | Wood chips, fine | | 18% |
| | | | 100% |

The premix is admixed in two batches, half being added to the rough wood chips and the remainder to the fine wood chips. The two components are then mixed and the mixture is hardened by pressing for 4 minutes at 180° C. The properties are as follows:
Bending strength 10.5 MPa
Transversal internal bond 0.63 MPa
Swelling in thickness after 2 hours: 2.4%
Swelling thickness in water after 24 hours: 6.3%.

EXAMPLE 7

| | | | |
|---|---|---|---|
| 1. | Wood chips, fine | | 15% |
| 2. | Waterglass | Premix | 10% |
| 3. | Melamine powder | | 6% |
| 4. | Waterglass | | 36% |
| 5. | Magnesium oxide | | 7% |
| 6. | Dolomite | | 13% |
| 7. | Perlite, expanded | | 3% |

| | -continued | |
|---|---|---|
| 8. | Micro silica | 10% |
| | | 100% |

The premix is admixed with wood chips and the remaining components are then added with continuous mixing. the mixture is hardened at room temperature, but it may also be hardened under increased pressure at normal or increased temperature. The final product is approximately 30% more lightweight than that of Example 2, but has poorer mechanical qualitites. By reinforcing the mixture, it is possible to improve the mechanical qualitites and weight may be further reduced by using higher proportions of light-weight components. Crushed Leca is also suitable for such mixtures.

EXAMPLE 8

| 1. | Waterglass | 38% |
|---|---|---|
| 2. | Magnesium oxide | 8% |
| 3. | Dolomite | 21% |
| 4. | Urea glue powder | 7% |
| 5. | Vinyl acetate disp. | 3% |
| 6. | Water | 2% |
| 7. | Dolomite | 11% |
| 8. | Waterglass | 10% |
| | | 100% |

The components are continuously mixed together. The mixture is then hardened at room temperature. The hardened product does not dissolve after 20 days of immersion in water. Upon 20 freezing/thawing cycles there is no visible change to be observed. This is also true of the product when it is used to form a coating on a Leca surface.

EXAMPLE 9

| 1. | Waterglass | 37% |
|---|---|---|
| 2. | Magnesium oxide | 7% |
| 3. | Dolomite | 37% |
| 4. | Leca, crushed | 15% |
| 5. | Waterglass | 4% |
| | | 100% |

The components are continuously mixed together. The mixture is then hardened at room temperature. The hardened product has qualities similar to those of Example 2, but it is more suitable for a coating on surfaces of Leca, concrete, or brick, since the product does not fissure during hardening.

EXAMPLE 10

| 1. | Waterglass | 34% |
|---|---|---|
| 2. | Magnesium oxide | 5% |
| 3. | Dolomite | 49% |
| 4. | Ethylene glycol | 4% |
| 5. | Dolomite | 8% |
| | | 100% |

The components are added together by continuous mixing. The mixture is then hardened at room temperature. The hardened product is especially suitable for smooth coats on a foundation of Leca, concrete, and brick, since the hardened product does not fissure and has qualities similar to those achieved in Example 1. Although the mechanical qualities are slightly reduced, they are sufficient for a surface coating. The product coated onto a Leca surface does not dissolve after being immersed in water for 20 days. Upon 20 freezing/thawing cycles, no change is observed.

I claim:

1. A fireproof, waterproof and acidproof binder consisting essentially of a hardened mixture of about 10-90% by weight of an alkali silicate about 1-40% by weight of a reactive metal oxide of magnesium or titanium; and about 1-70% by weight of a carbonate compound.

2. The binder of claim 1 wherein the alkali silicate is sodium waterglass, potassium waterglass or mixtures thereof.

3. The binder of claim 1 wherein the carbonate compound is calcium carbonate, magnesium carbonate, or mixtures thereof.

4. The binder of claim 1 further consisting essentially of magnesium silicate in an amount of up to 50% by weight.

5. The binder of claim 4 wherein the magnesium silicate is olivine.

6. The binder of claim 1 further consisting essentially of feldspar in an amount of up to 40% by weight.

7. The binder of claim 6 wherein the feldspar is a sodium, calcium, potassium feldspar or mixtures thereof.

8. The binder of claim 1 further consisting essentially of chemically active microsilica in an amount of up to 30% by weight.

9. The binder of claim 8 wherein the microsilica is an amorphous microsilica.

10. The binder of claim 1 further consisting essentially of a potassium-sodium-aluminium silicate in an amount of up to 40% by weight.

11. The binder of claim 10 wherein the potassium-sodium-aluminum silicate is nepheline.

12. The binder of claim 1 further consisting essentially of sodium carbonate in an amount of up to 10% by weight.

13. The binder of claim 1 further consisting essentially of a filler.

14. The binder of claim 13 wherein said filler is up to 10 weight percent expanded perlite, up to 30 weight percent expanded clay, up to 7 weight percent wood fibers, up to 10 weight percent cement, up to 20 weight percent limestone dust, or up to 30 weight percent sand.

15. The binder of claim 13 wherein the filler is Portland cement, chalk or fine quartz sand.

16. The binder of claim 13 further consisting essentially of one or more organic binder components in an amount of up to 7% by weight.

17. The binder of claim 16, wherein the organic binder component is a urea, melamine, phenol, acetate, glycol, mineral spirit, acrylic, bitumen, tall oil resin or a mixture thereof.

18. A fireproof, waterproof and acidproof binder consisting essentially of a hardened mixture of about 10-90% by weight of an alkali silicate, wherein said silicate is a sodium waterglass, a potassium waterglass, or mixtures thereof; about 1-40% by weight of a reactive metal oxide wherein said metal oxide is magnesium or titanium; and about 1-70% by weight of a carbonate compound wherein said carbonate compound is a calcium carbonate, a magnesium carbonate or mixtures thereof.

19. The binder of claim 18 wherein the reactive metal oxide is magnesium oxide and the carbonate mixture is dolomite.

20. The binder of claim 18 further consisting essentially of a filler.

21. The binder of claim 20 wherein said filler is up to 10 weight percent expanded perlite, up to 30 weight percent expanded clay, up to 7 weight percent wood fibers, up to 10 weight percent cement, up to 20 weight percent limestone dust, or up to 30 weight percent sand.

22. The binder of claim 19 further consisting essentially of an additional silica containing compound.

23. The binder of claim 22 wherein said additional silica containing compound is magnesium silicate, feldspar, chemically active silica, or a potassium-sodium-aluminum silicate.

24. The binder of claim 19 further consisting essentially of a filler.

25. The binder of claim 24 wherein said filler is expanded clay, expanded perlite, an organic binder or wood fibers.

26. The binder of claim 19 further consisting essentially of an inorganic filler.

27. The binder of claim 26 wherein said inorganic filler is a cement, limestone dust or sand.

28. The binder of claim 19 further consisting essentially of water.

29. The binder of claim 19 further consisting essentially of a sodium carbonate.

30. The binder of claim 1 wheren the reactive metal oxide is magnesium oxide.

* * * * *